United States Patent
Park

(10) Patent No.: US 8,386,171 B2
(45) Date of Patent: Feb. 26, 2013

(54) METHOD FOR MATCHING VIRTUAL MAP AND SYSTEM THEREOF

(75) Inventor: Sada Park, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 578 days.

(21) Appl. No.: 12/599,968

(22) PCT Filed: Dec. 10, 2007

(86) PCT No.: PCT/KR2007/006404
§ 371 (c)(1),
(2), (4) Date: Nov. 12, 2009

(87) PCT Pub. No.: WO2008/140165
PCT Pub. Date: Nov. 20, 2008

(65) Prior Publication Data
US 2010/0241353 A1    Sep. 23, 2010

(30) Foreign Application Priority Data
May 16, 2007    (KR) .................... 10-2007-0047715

(51) Int. Cl.
*G01C 21/32* (2006.01)
(52) U.S. Cl. .................. 701/428; 701/447; 340/995.14
(58) Field of Classification Search .................. 701/208
See application file for complete search history.

(56) References Cited

U.S. PATENT DOCUMENTS

| 5,602,740 | A | * | 2/1997 | Nishiyama | 701/467 |
| 5,862,511 | A | | 1/1999 | Croyle et al. | |
| 2002/0072849 | A1 | * | 6/2002 | Endo et al. | 701/211 |
| 2003/0093221 | A1 | | 5/2003 | Adachi | |
| 2004/0073364 | A1 | * | 4/2004 | Jung et al. | 701/213 |
| 2005/0159884 | A1 | * | 7/2005 | Suzuki et al. | 701/208 |

FOREIGN PATENT DOCUMENTS

| EP | 1500907 A2 | 1/2005 |
| EP | 1500907 A2 * | 1/2005 |
| JP | 05297801 | 10/1993 |
| JP | 08068651 | 3/1996 |
| JP | 09184732 | 7/1997 |
| JP | 2005121382 | 5/2005 |

OTHER PUBLICATIONS

Supplementary European Search Report dated Apr. 24, 2012 in European Application No. 07851375.1, filed Dec. 10, 2007.
International Search Report mailed Mar. 20, 2008 for International Application No. PCT/KR2007/006404.

* cited by examiner

*Primary Examiner* — Shelley Chen
(74) *Attorney, Agent, or Firm* — Saliwanchik, Lloyd & Eisenschenk

(57) ABSTRACT

A method of matching a virtual map, the method including: receiving Global Positioning System (GPS) information; generating a basic map matching result using the GPS information; generating a virtual map matching location based on the basic map matching result; and displaying the virtual map matching location.

12 Claims, 8 Drawing Sheets

METHOD FOR MATCHING VIRTUAL MAP AND SYSTEM THEREOF

FIELD OF THE DISCLOSURE

The present disclosure relates to a method and system of matching a virtual map in a navigation system, and more particularly, to a method and system of matching a virtual map which can generate a segmented virtual map matching result using Global Positioning System (GPS) information and precisely reflect an actual location of a vehicle.

BACKGROUND OF THE DISCLOSURE

Generally, since a navigation system receives Global Positioning System (GPS) information from a GPS receiver only once per second, screen update due to vehicle movement is performed only once per second despite operating at high speeds.

A conventional navigation system has a problem that a movement distance of a vehicle is reflected once per second since the GPS information is received once per second even when the vehicle moves a long distance each second. The conventional navigation system also has a problem that driving of the vehicle may not be smoothly expressed since the screen update is performed once per second.

Accordingly, a method of moving a location on the navigation system to be close to an actual location of the vehicle is required.

SUMMARY OF THE DISCLOSURE

The present disclosure provides a method and system of matching a virtual map which can generate a virtual map matching result using Global Positioning System (GPS) information and precisely reflect an actual location of a vehicle.

The present disclosure also provides a method and system of matching a virtual map which can segment location update and an angle change of a vehicle on a navigation system more precisely than a conventional art when turning left/right, thereby providing a smooth feeling on a screen.

According to an aspect of the present disclosure, there is provided a method of matching a virtual map, the method including: receiving Global Positioning System (GPS) information; generating a basic map matching result using the GPS information; generating a virtual map matching location based on the basic map matching result; and displaying the virtual map matching location.

According to another aspect of the present disclosure, there is provided a system for matching a virtual map, the system including: a GPS receiving unit to receive GPS information; a basic map matching unit to generate a basic map matching result using the GPS information; a virtual map matching unit to generate a virtual map matching location based on the basic map matching result; and a display unit to display the virtual map matching location.

DETAILED DESCRIPTION OF EXEMPLARY EMBODIMENTS

Figure 1:
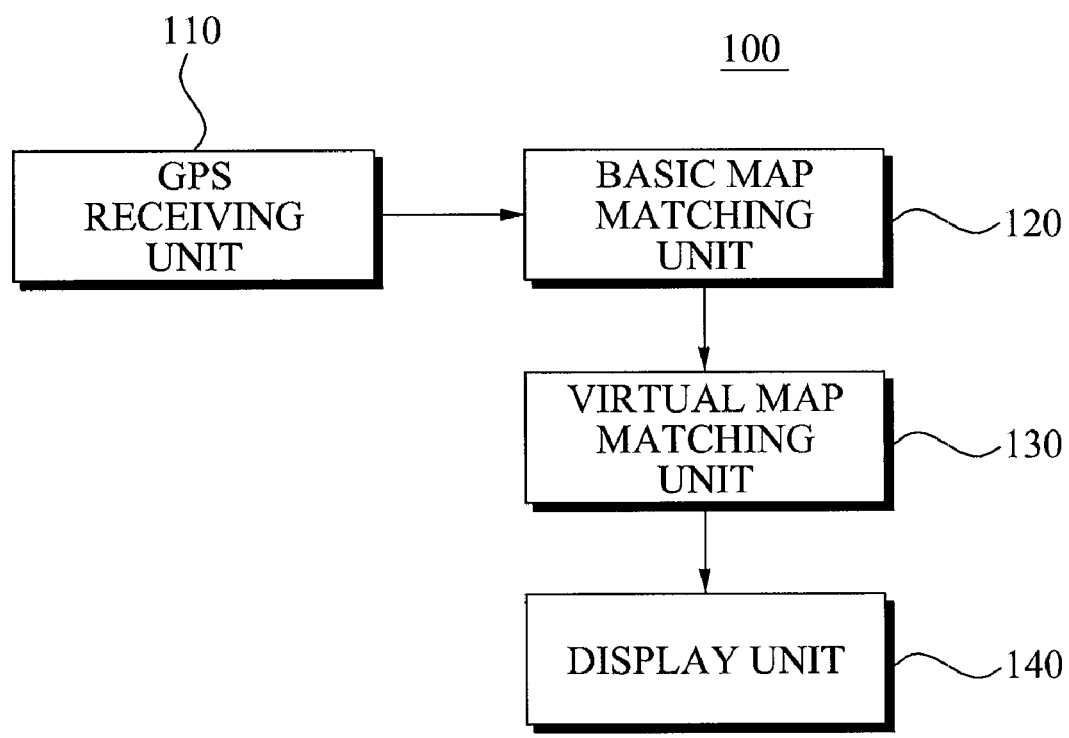
FIG. 1 is a block diagram illustrating a configuration of a system for matching a virtual map according to an exemplary embodiment of the present disclosure.

Reference will now be made in detail to embodiments of the present disclosure, examples of which are illustrated in the accompanying drawings, wherein like reference numerals refer to the like elements throughout. The embodiments are described below in order to explain the present disclosure by referring to the figures.

FIG. 1 is a block diagram illustrating a configuration of a system 100 for matching a virtual map according to an exemplary embodiment of the present disclosure.

Referring to FIG. 1, the system 100 for matching the virtual map includes a Global Positioning System (GPS) receiving unit 110, a basic map matching unit 120, a virtual map matching unit 130, and a display unit 140.

The GPS receiving unit 110 receives GPS information from a GPS satellite.

The basic map matching unit 120 generates a basic map matching result using the GPS information. The basic map matching unit 120 recognizes a current location of a vehicle using the GPS information, and generates the basic map matching result of matching the current location of the vehicle in a map.

The virtual map matching unit 130 generates a virtual map matching location based on the basic map matching result. The virtual map matching unit 130 generates the virtual map matching location according to an expected movement distance, a location, and a vehicle direction based on the basic map matching result.

Figure 2:
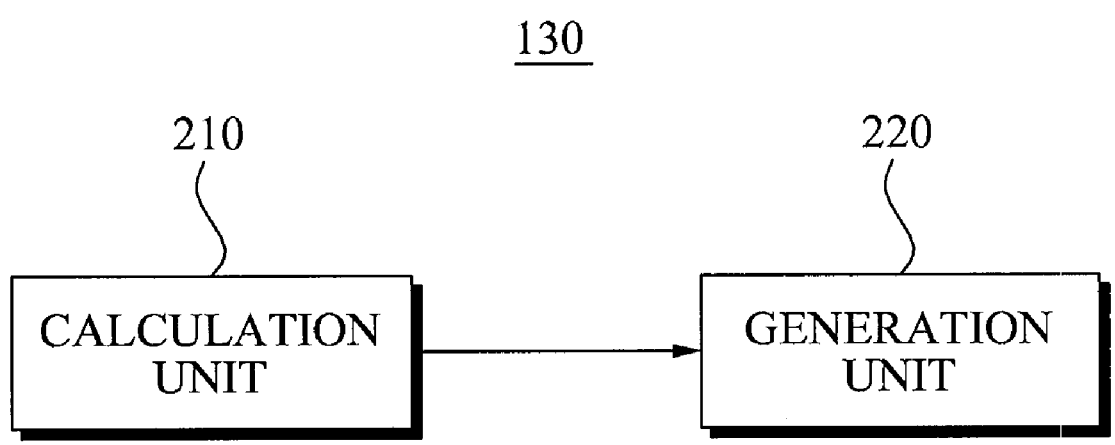
FIG. 2 is a block diagram illustrating a virtual map matching unit of FIG. 1.

FIG. 2 is a block diagram illustrating the virtual map matching unit 130 of FIG. 1.

Referring to FIG. 2, the virtual map matching unit 130 includes a calculation unit 210 and a generation unit 220. The calculation unit 210 calculates a movement distance using a speed based on the GPS information, which generates a basic map matching result, and a split time generated by virtual map matching. The movement distance is calculated by a result of multiplying the speed based on the GPS information by the split time generated by virtual map matching. The split time generated by virtual map matching corresponds to a time of desiring to minutely divide one second, for example, 0.2 seconds when a case of dividing one second by five is assumed. For example, when the speed based on the GPS information corresponds to 10 m/s and the split time generated by virtual map matching corresponds to 0.2 seconds, the calculation unit 210 may calculate the movement distance of two m based on the result (10 msec*0.2 sec) of multiplying the speed based on the GPS information by the split time generated by virtual map matching. The generation unit 220 reflects the movement distance on the basic map matching result and generates the virtual map matching location. For example, when the location based on the basic map matching result corresponds to five km and the movement distance corresponds to two m, the generation unit 220 may generate a sum of the location based on the basic map matching result and the movement distance, five km two m, as the virtual map matching location.

Figure 3:
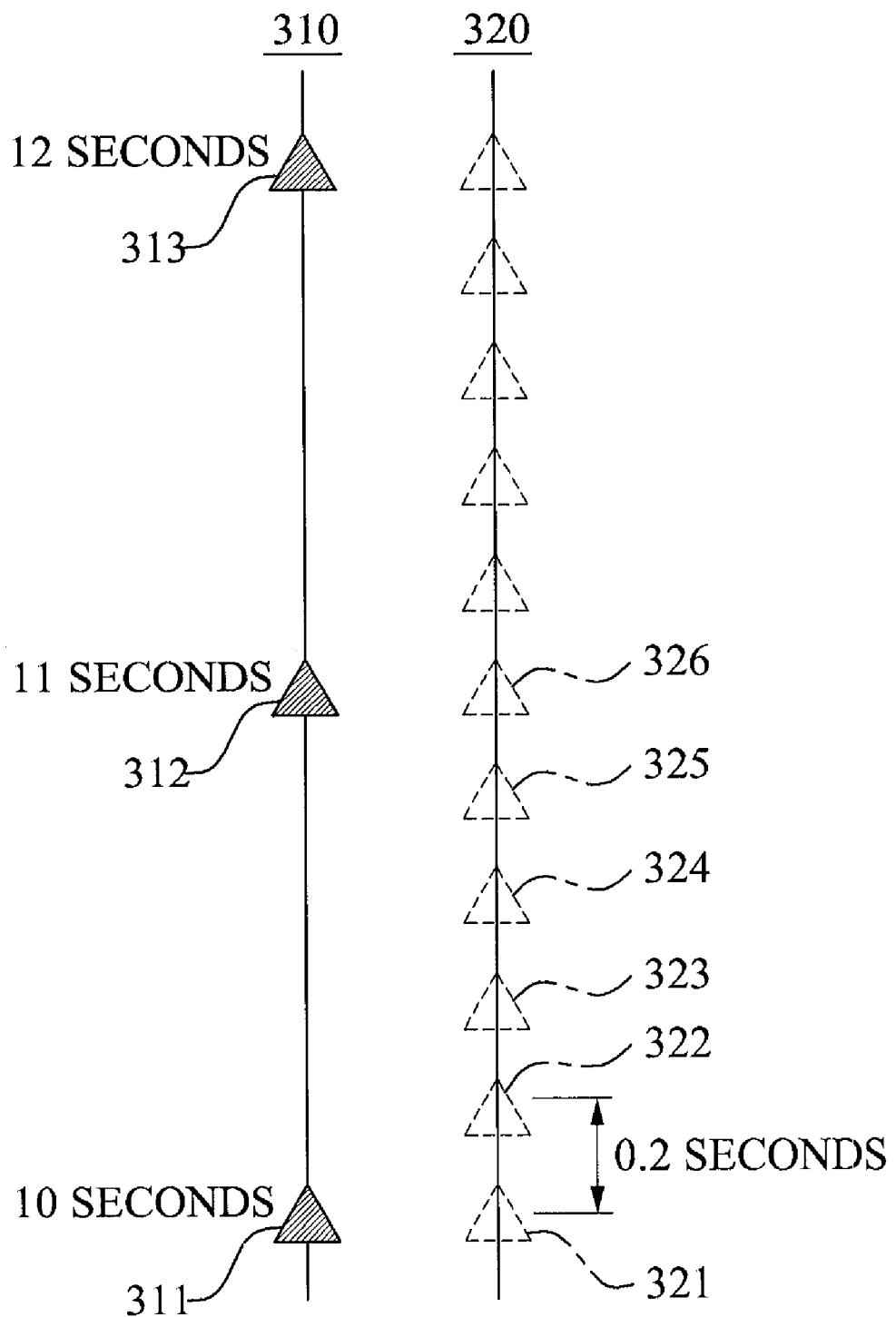
FIG. 3 illustrates an example of a basic map matching result and a virtual map matching location according to an exemplary embodiment of the present disclosure.

FIG. 3 illustrates an example of a basic map matching result 310 and a virtual map matching location 320 according to an exemplary embodiment of the present disclosure.

Referring to FIG. 3, the basic map matching result 310 is a result of matching a location of a vehicle for each time using GPS information received once per second. A first basic map matching result 311 denotes the location of the vehicle at 10 seconds, and a second basic map matching result 312 denotes the location of the vehicle at 11 seconds, and a third basic map matching result 313 denotes the location of the vehicle at 12 seconds. The basic map matching unit 120 generates the location of the vehicle generated once per second using the GPS information as the basic map matching result 310.

The virtual map matching location 320 is generated based on the basic map matching result 310 and denotes a case where the basic map matching result 310 is divided by five and is segmented per 0.2 seconds. A first virtual map matching location 321 is the same location as the first basic map matching result 311 at the same ten seconds as the first basic map matching result 311. A second virtual map matching location 322 denotes a virtual location of the vehicle at 10.2 seconds after 0.2 seconds from the first basic map matching result 311. A third virtual map matching location 323 denotes the virtual location of the vehicle at 10.4 seconds after 0.4 seconds from the first basic map matching result 311 and after 0.2 seconds from the second virtual map matching location 322. A fourth virtual map matching location 324 denotes the virtual location of the vehicle at 10.6 seconds after 0.6 seconds from the first basic map matching result 311 and after 0.2 seconds from the third virtual map matching location 323. A fifth virtual map matching location 325 denotes the virtual location of the vehicle at 10.8 seconds after 0.8 seconds from the first basic map matching result 311 and after 0.2 seconds from the fourth virtual map matching location 324. A sixth virtual map matching location 326 denotes the virtual location of the vehicle at 11 seconds after one second from the first basic map matching result 311 and after 0.2 seconds from the fifth virtual map matching location 325. The sixth virtual map matching location 326 is same as the second basic map matching result (location) 312 when a speed of the vehicle is constant.

As described above, since a guidance interval of 0.2 seconds becomes shorter than a case where route guidance is conventionally performed once per second, the system for matching the virtual map according to an exemplary embodiment of the present disclosure may smoothly express a driving route of the vehicle.

Figure 4:
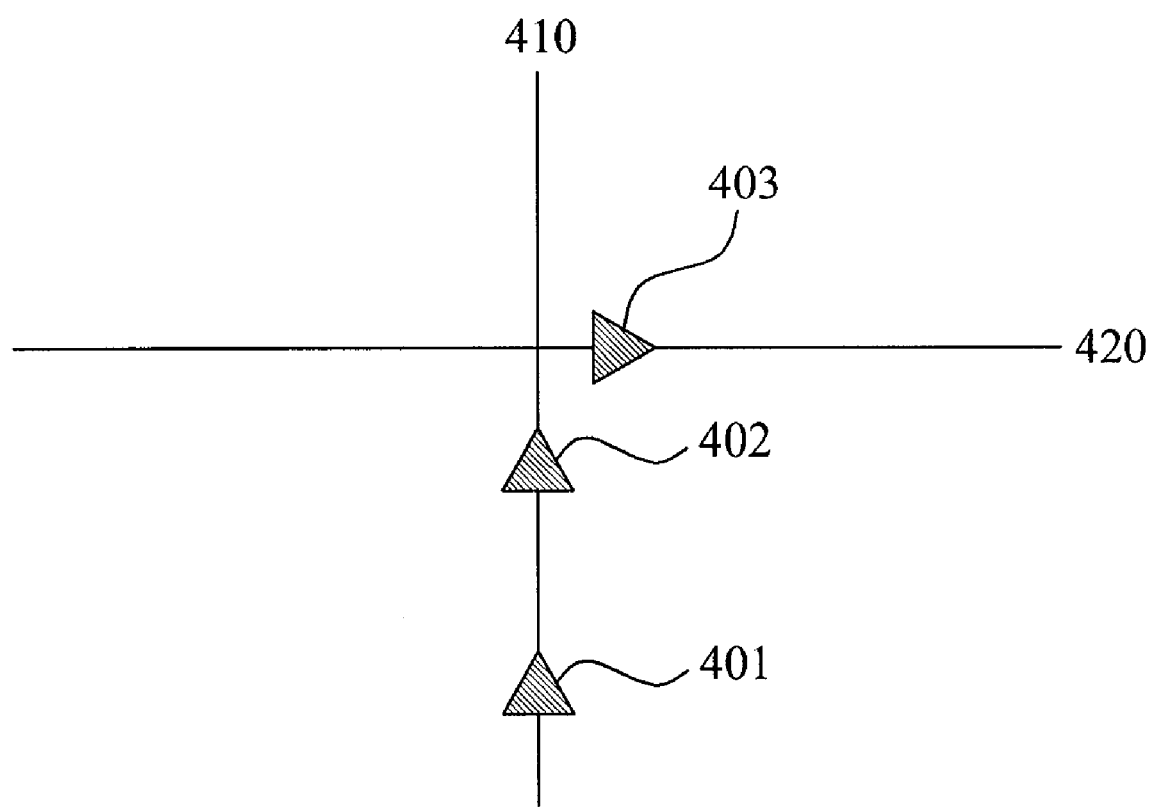
FIG. 4 illustrates a basic map matching location with respect to two links according to an exemplary embodiment of the present disclosure.

FIG. 4 illustrates a basic map matching location with respect to two links according to an exemplary embodiment of the present disclosure.

Referring to FIG. 4, the basic map matching unit 120 generates basic map matching results 401, 402, and 403 once per second using GPS information received once per second even when turning right at an intersection of a first link 410 and a second link 420.

The virtual map matching unit 130 divides an angle of a vehicle when turning left or when turning right by a predetermined number, and generates a virtual map matching location. The virtual map matching unit 130 divides the angle of the vehicle when turning left or when turning right several times, and generates the virtual map matching location to smoothly show a driving route. Since the virtual map matching unit 130 may not determine whether the vehicle turns left or whether the vehicle turns right, using the basic map matching results 401, 402, and 403, the virtual map matching unit 130 performs virtual map matching only when the retrieved route exists.

Figure 5:
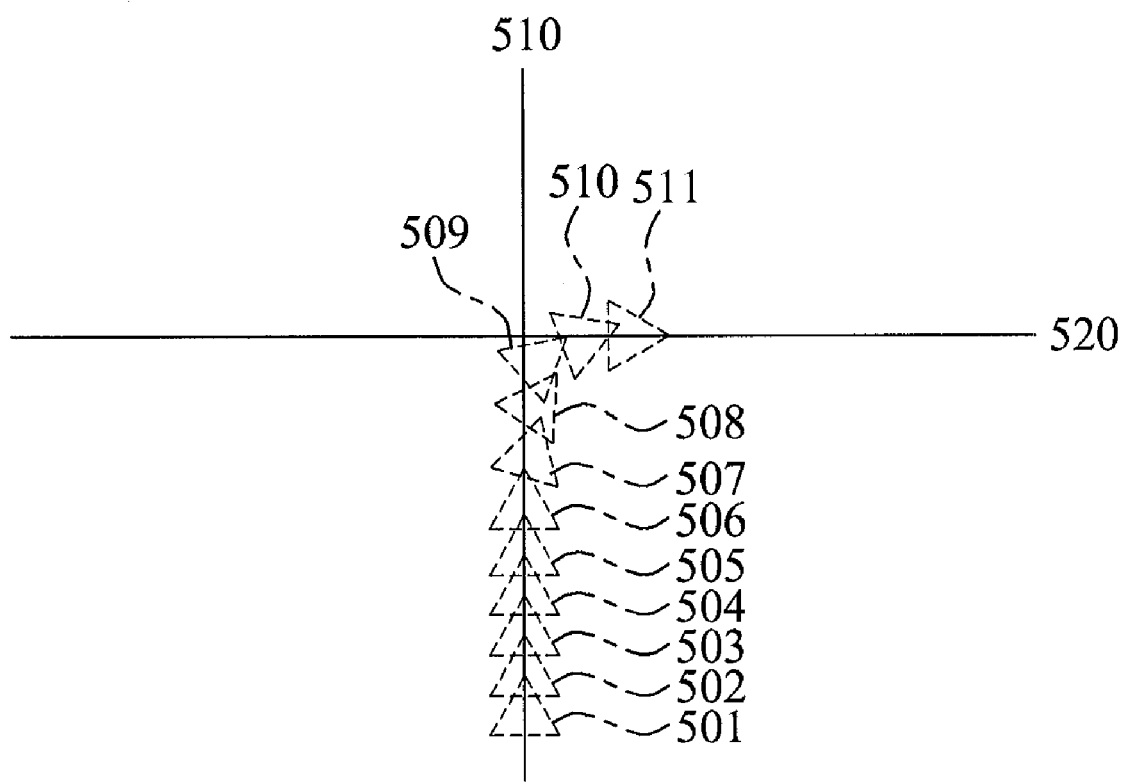
FIG. 5 illustrates a virtual map matching location with respect to two links according to an exemplary embodiment of the present disclosure.

FIG. 5 illustrates a virtual map matching location with respect to two links according to an exemplary embodiment of the present disclosure.

Referring to FIG. 5, the virtual map matching unit 130 divides an angle of a vehicle by a number of virtual map matching generations using a difference between an angle of a first link 510 and an angle of a second link 520, and generates virtual map matching locations 510 and 511. For example, the virtual map matching unit 130 may calculate the difference between the angle of the first link 510 and the angle of the second link 520 by the number of virtual map matching generations, five, and may calculate the angle of turning per 0.2 seconds.

Figure 6:
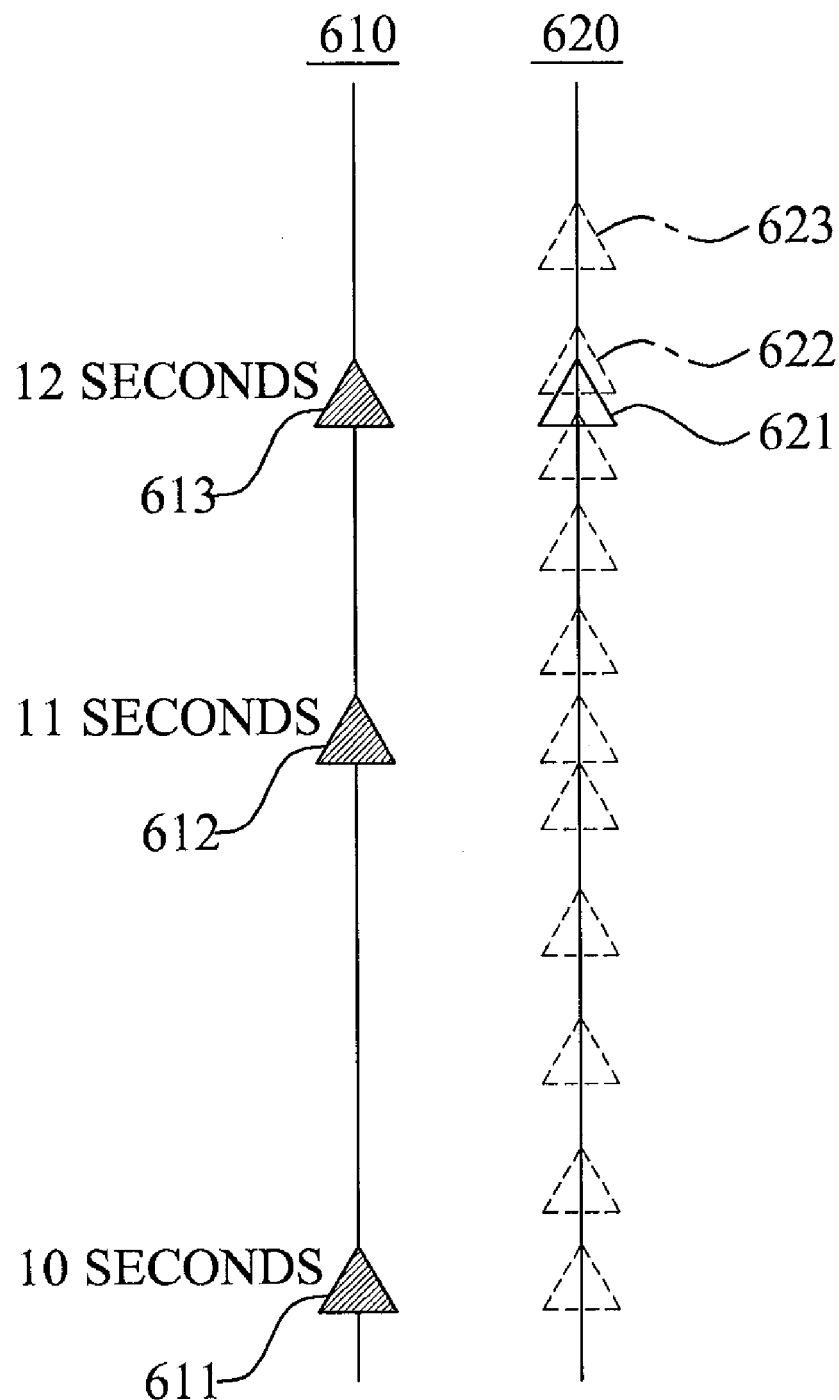
FIG. 6 illustrates an error that an actual location of a vehicle is different from a location generated by virtual map matching according to an exemplary embodiment of the present disclosure.

FIG. 6 illustrates an error that an actual location of a vehicle is different from a location generated by virtual map matching according to an exemplary embodiment of the present disclosure.

Referring to FIG. 6, a basic map matching result 610 with respect to the actual location of the vehicle details a vehicle location once per second when the vehicle decelerates. A first basic map matching result 611 denotes the location of the vehicle generated by receiving GPS information when the vehicle moves for 10 seconds, and a second basic map matching result 612 denotes the location of the vehicle generated by receiving the GPS information when the vehicle moves for 11 seconds, and a third basic map matching result 613 denotes the location of the vehicle generated by receiving the GPS information when the vehicle moves for 12 seconds.

A virtual map matching result error 620 denotes an example that the vehicle needs to turn back on a navigation system when a user suddenly decelerates the vehicle. A first location 621 denotes the location of the vehicle generated by receiving the GPS information when the vehicle moves for 12 seconds as the vehicle decelerates, and a second location 622 denotes the location based on the virtual map matching result when a speed of the vehicle is assumed to be constant and the vehicle moves for 11.6 seconds, and a third location 623 denotes the location based on the virtual map matching result when the speed of the vehicle is assumed to be constant and the vehicle moves for 11.8 seconds.

As described above, since the speed of the vehicle is inconstant and is changed, the virtual map matching result error 620, that is, a back phenomenon occurs when map matching information based on actual 12 seconds is displayed in the case where that the virtual map matching location 622 with respect to 11.6 seconds and the virtual map matching location 623 with respect to 11.8 seconds are further than the basic map matching location 621 with respect to 12 seconds, as illustrated in FIG. 6.

In order to prevent the error due to the back phenomenon, the virtual map matching unit 130 reflects deceleration of a speed using an average value of speeds from a current time to a predetermined time, the speeds being used for calculating the virtual map matching location, and generates the virtual map matching result. For example, the virtual map matching unit 130 may generate the virtual map matching result using the average value of speeds for three seconds of 10 seconds, 11 seconds, and 12 seconds in the case of 12 seconds when generating the virtual map matching location.

The virtual map matching unit 130 compares a location based on the basic map matching result and the virtual map matching location, and discards the virtual map matching location when the virtual map matching location is further than the location based on the basic map matching result.

The display unit 140 displays the virtual map matching location. The display unit 140 displays the location of the vehicle on a navigation screen to move close to the actual location of the vehicle using the virtual map matching location that is more segmented than the basic map matching location. As described above, the system 100 for matching the virtual map according to an exemplary embodiment of the present disclosure may generate the segmented virtual map matching location using the GPS information and may minutely reflect the actual location of the vehicle.

Figure 7:
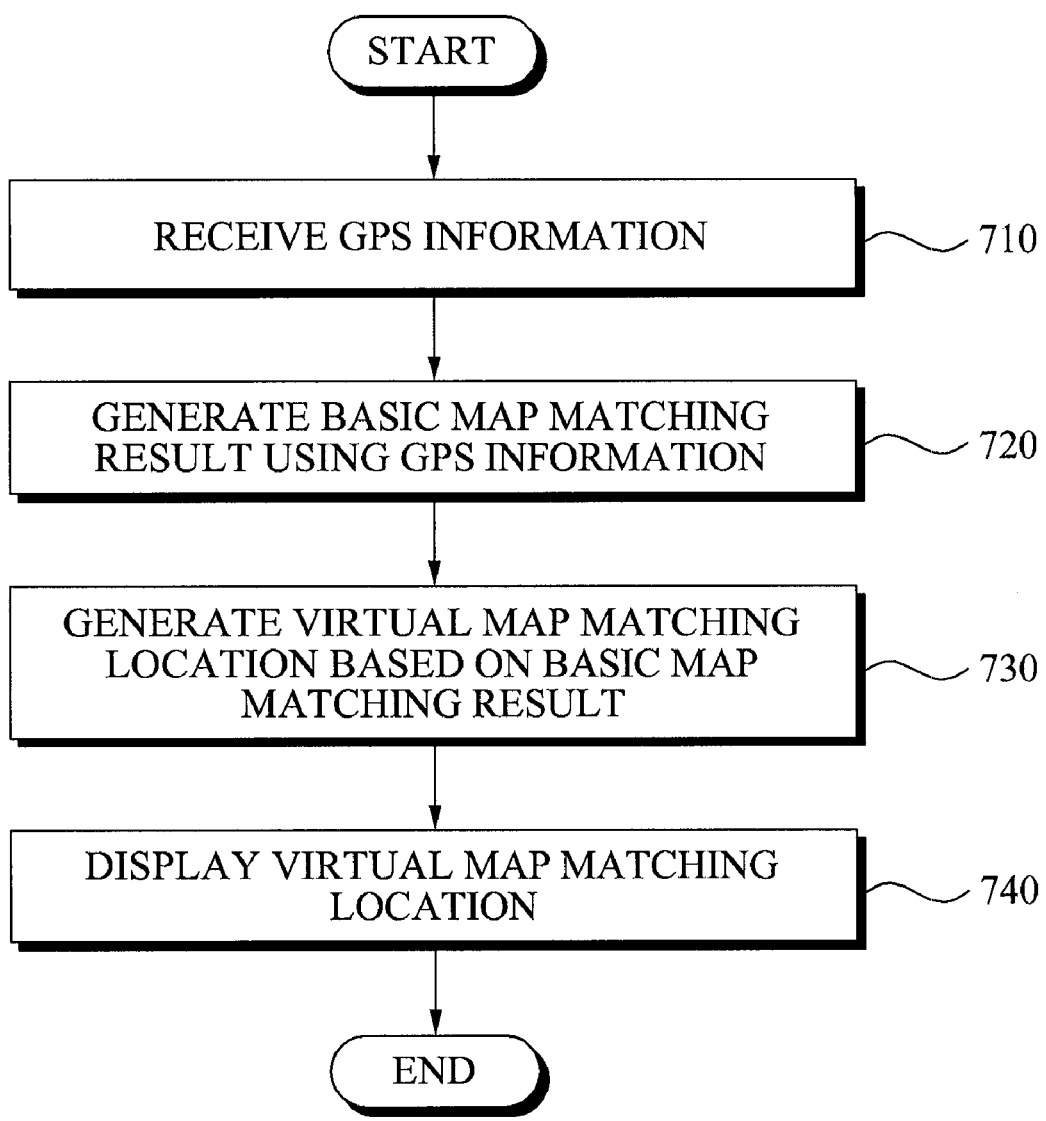
FIG. 7 is a flowchart illustrating a method of matching a virtual map according to an exemplary embodiment of the present disclosure.

FIG. 7 is a flowchart illustrating a method of matching a virtual map according to an exemplary embodiment of the present disclosure.

Referring to FIG. 7, in operation 710, a system for matching the virtual map receives GPS information. In operation 710, the system for matching the virtual map receives the GPS information from a GPS satellite at predetermined intervals.

In operation 720, the system for matching the virtual map generates a basic map matching result using the GPS information. In operation 720, the system for matching the virtual map generates the basic map matching result of matching a location of a vehicle, a speed, a vehicle direction, and the like in a map, using the GPS information.

In operation 730, the system for matching the virtual map generates a virtual map matching location based on the basic map matching result. In operation 730, the system for matching the virtual map generates the virtual map matching location according to an expected movement distance, a location, and a vehicle direction based on the basic map matching result.

In operation 730, when a retrieved route exists, the system for matching the virtual map divides an angle of a vehicle when turning left or when turning right by a predetermined number, and generates the virtual map matching location. In operation 730, the system for matching the virtual map divides an angle of a vehicle by a number of virtual map matching generations using a difference between an angle with respect to a first link and an angle with respect to a second link, and generates the virtual map matching location.

In operation 730, the system for matching the virtual map reflects a change of a speed using an average value of speeds from a current time to a predetermined time, the speeds being used for generating the virtual map matching location, and generates the virtual map matching location. In operation 730, the system for matching the virtual map reflects deceleration of the speed using the average value of speeds from the current time to the predetermined time, the speeds being used for calculating the virtual map matching location, and generates the virtual map matching location. For example, in operation 730, the system for matching the virtual map may generate the virtual map matching result using the average value of speeds for three seconds of 10 seconds, 11 seconds, and 12 seconds in the case of 12 seconds when the virtual map matching location is calculated.

In operation 730, the system for matching the virtual map compares a location based on the basic map matching result and a location based on a virtual map matching result, and discards the virtual map matching result when the location based on the virtual map matching result is further than the location based on the basic map matching result. As illustrated in FIG. 6, in operation 730, the system for matching the virtual map does not use the location based on the virtual map matching result when the location based on the virtual map matching result is further than the location based on the basic map matching result.

Figure 8:
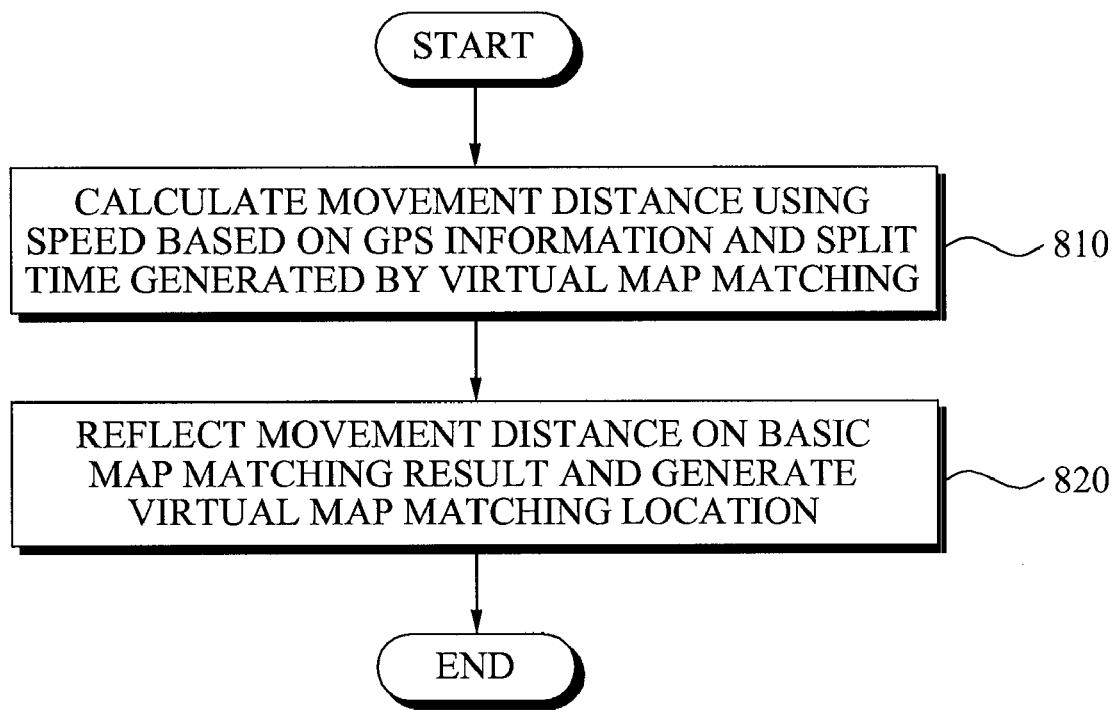
FIG. 8 is a flowchart illustrating a virtual map matching process according to an exemplary embodiment of the present disclosure.

FIG. 8 is a flowchart illustrating a virtual map matching process according to an exemplary embodiment of the present disclosure.

Referring to FIG. 8, in operation 810, the system for matching the virtual map calculates a movement distance using a speed based on the GPS information and a split time generated by virtual map matching. In operation 810, the system for matching the virtual map calculates the movement distance by multiplying the speed based on the GPS information by the split time generated by virtual map matching. The split time generated by virtual map matching corresponds to a time of desiring to minutely divide one second, for example, 0.2 seconds when a case of dividing one second by five is assumed. For example, when the speed based on the GPS information corresponds to 10 m/s and the split time generated by virtual map matching corresponds to 0.2 seconds, the system for matching the virtual map may calculate the movement distance of two m based on the result (10 msec*0.2 sec) of multiplying the speed based on the GPS information by the split time generated by virtual map matching in operation 810.

In operation 820, the system for matching the virtual map reflects the movement distance on the basic map matching result and generates the virtual map matching location. For example, when the location based on the basic map matching result corresponds to five km and the movement distance corresponds to two m, the system for matching the virtual map may generate a sum of the location based on the basic map matching result and the movement distance, five km two m, as the virtual map matching location in operation 820.

In operation 740, the system for matching the virtual map displays the virtual map matching location. In operation 740, the system for matching the virtual map displays the location of the vehicle on a navigation screen to move close to the actual location of the vehicle using the virtual map matching location that is more segmented than a conventional art.

Therefore, the method of matching the virtual map according to an exemplary embodiment of the present disclosure may generate the virtual map matching result, which is more detailed than the basic map matching result, using the GPS information and may minutely reflect the actual location of the vehicle.

The method of matching the virtual map according to the exemplary embodiments of the present disclosure may be recorded in computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present disclosure and vice versa.

According to the above-described exemplary embodiments of the present disclosure, there is provided a method and system of matching a virtual map which can generate a segmented virtual map matching result using GPS information and precisely reflect an actual location of a vehicle.

Also, according to the above-described exemplary embodiments of the present disclosure, there is provided a method and system of matching a virtual map which can segment location update and an angle change of a vehicle on a navigation system more precisely than a conventional art when turning left/right, thereby providing a smooth feeling on a screen.

Although a few embodiments of the present disclosure have been shown and described, the present disclosure is not limited to the described embodiments. Instead, it would be appreciated by those skilled in the art that changes may be made to these embodiments without departing from the principles and spirit of the present disclosure, the scope of which is defined by the claims and their equivalents.

The invention claimed is:

1. A method of matching a virtual map, the method comprising:
    receiving Global Positioning System (GPS) information;
    generating a basic map matching result using the GPS information, wherein the basic map matching is map matching of a GPS location;
    generating a virtual map matching location based on the basic map matching result, wherein the virtual map matching is map matching of an expected movement distance, a location, and a vehicle direction based on the basic map matching result; and
    displaying the virtual map matching location,
    wherein, when a retrieved route exists, the generating of the virtual map matching location divides a turning angle of a vehicle when turning left or when turning right by a predetermined number, and generates the virtual map matching location.

2. The method of claim 1, wherein the generating of the virtual map matching location comprises:
    calculating a movement distance using a speed based on the GPS information and a split time generated by virtual map matching; and
    reflecting the movement distance on the basic map matching result and generating the virtual map matching location.

3. The method of claim 1, wherein the generating of the virtual map matching location generates the virtual map matching location according to an expected movement distance, a location, and a vehicle direction based on the basic map matching result.

4. The method of claim 1, wherein the generating of the virtual map matching location divides a turning angle of a vehicle by a number of virtual map matching generations using a difference between an angle with respect to a first link and an angle with respect to a second link, and generates the virtual map matching location.

5. The method of claim 1, wherein the generating of the virtual map matching location reflects a change of a speed using an average value of speeds from a current time to a predetermined time, the speeds being used for generating the virtual map matching location, and generates the virtual map matching location.

6. The method of claim 1, wherein the generating of the virtual map matching location compares a location based on the basic map matching result and a location based on a virtual map matching result, and discards the virtual map matching result when the location based on the virtual map matching result is further along the route traveled than the location based on the basic map matching result.

7. A non-transitory computer-readable recording medium storing a program for implementing the method according to claim 1.

8. A system for matching a virtual map, the system comprising:
    a GPS receiving unit to receive GPS information;
    a basic map matching unit to generate a basic map matching result using the GPS information, wherein the basic matching is map matching of a GPS location;
    a virtual map matching unit to generate a virtual map matching location based on the basic map matching result, wherein the virtual map matching is map matching of an expected movement distance, a location, and a vehicle direction based on the basic map matching result; and
    a display unit to display the virtual map matching location,
    wherein, when a retrieved route exists, the virtual map matching unit divides a turning angle of a vehicle when turning left or when turning right by a predetermined number, and generates the virtual map matching location.

9. The system of claim 8, wherein the virtual map matching unit comprises:
    a calculation unit to calculate a movement distance using a speed based on the GPS information and a split time generated by virtual map matching; and
    a generation unit to reflect the movement distance on the basic map matching result and to generate the virtual map matching location.

10. The system of claim 9, wherein the virtual map matching unit divides a turning angle of a vehicle by a number of virtual map matching generations using a difference between an angle with respect to a first link and an angle with respect to a second link, and generates the virtual map matching location.

11. The system of claim 8, wherein the virtual map matching unit reflects deceleration of a speed using an average value of speeds from a current time to a predetermined time, the speeds being used for generating the virtual map matching location, and generates the virtual map matching location.

12. The system of claim 8, wherein the virtual map matching unit compares a location based on the basic map matching result and a location based on a virtual map matching result, and discards the virtual map matching result when the location based on the virtual map matching result is further along the route traveled than the location based on the basic map matching result.

* * * * *